United States Patent [19]

Taylor

[11] Patent Number: 5,310,496
[45] Date of Patent: May 10, 1994

[54] VEGETABLE OIL BASED PAINT REMOVING COMPOSITIONS

[75] Inventor: Anthony B. Taylor, Orono, Me.

[73] Assignee: Chute Chemical Company, Bangor, Me.

[21] Appl. No.: 717,035

[22] Filed: Jun. 18, 1991

[51] Int. Cl.$^5$ .......................... C09D 9/00; C11D 7/26
[52] U.S. Cl. .................................................. 252/171
[58] Field of Search ........................................ 252/171

[56] References Cited

U.S. PATENT DOCUMENTS

| | | | |
|---|---|---|---|
| 3,629,004 | 12/1971 | Cooper et al. | 252/171 |
| 4,120,810 | 10/1978 | Palmer | 252/153 |
| 4,639,327 | 1/1987 | McGaha | 252/143 |
| 4,666,626 | 5/1987 | Francisco | 252/153 |
| 4,737,195 | 4/1986 | Carandang et al. | 134/38 |
| 4,749,510 | 6/1988 | Nelson | 252/166 |
| 4,780,235 | 10/1988 | Jackson | 252/171 |
| 4,986,927 | 1/1991 | Elton | 252/118 |
| 5,011,621 | 4/1991 | Sullivan | 252/162 |

OTHER PUBLICATIONS

U.S. Statutory Invention Registration H300 published in the Official Gazette Jul. 7, 1987, Peter J. Hearst p. 6 Stripping Agent for Chemically Resistant Coatings filed Nov. 4, 1986 Ser. No. 982,777.

Encyclopedia of Chemical Technology, vol. 23 pp. 717–741 "Vegetable Oils" W. Hamm Unilever Research Colworth Laboratory, UK (no date).

Concise Encyclopedia of Chemical Technology 1985 no month "Fats and Fatty Oils" pp. 458–460 F. A. M. Buck, King Buck & Associates, Merritt G. Marbach, Shell Chemical Co.

Arco Chemical Company Technical Update: NMP in Paint Stripper Applications OP90-1090-5M, References P. J. Hearst U.S. Statutory Invention Reg. H300, Jul., '87.

*Primary Examiner*—Michael Lewis
*Assistant Examiner*—Stuart L. Hendrickson
*Attorney, Agent, or Firm*—Hayes, Soloway, Hennessey, Grossman, & Hage

[57] ABSTRACT

A vegetable oil based paint stripping composition used in a process where it is applied to a substrate coated with fully or partially cured paint, having particular utility for use in stripping paint or stripping organic polymer coatings, and a method of employing same is described.

3 Claims, 1 Drawing Sheet

VEGETABLE OIL BASED PAINT REMOVING COMPOSITIONS

BACKGROUND OF THE INVENTION

1. Technical Field

The present invention relates to a paint stripping composition used in a process where it is applied to a substrate coated with fully or partially cured paint. The composition of the present invention has particular utility for use in stripping paint and will be described in connection with such utility, although other utilities, for example, stripping organic polymer coatings, are contemplated. The present invention is also directed to a method of employing the stripping composition.

2. Brief Description of the Background Art

A paint or varnish remover should ideally remove all traces of the coating quickly and with a minimum of labor, and it should leave the substrate unharmed and suitable for reprocessing or refinishing. A number of design criteria have been identified for a modern stripper: stripping ability, lack of corrosiveness to substrates, freedom from galvanic attack at the juncture of dissimilar materials, freedom from noxious and toxic chemicals, good shelf life, high viscosity, where needed, sealable internally or with a water cap to prevent rapid evaporation, and ability to leave a readily recoatable surface. See The Encyclopedia of Chemical Technology, Third Edition, Volume 16, 762-768 (1981).

Methylene chloride paint strippers have long been the industry standard for paint stripper performance. It has been established that methylene chloride is effective for quickly softening most types of paints. It has been suggested that the effectiveness of methylene chloride results from its smaller molecular size. Its low molecular weight enables it to penetrate rapidly into a coating, and its intermediate solvency enables the coating not to be dissolved so that redisposition on the substrate is avoided. Methylene chloride removers have also been modified to increase stripping power for special purposes. These modifying chemicals include amines, alkalies and organic acids. See U.S. Pat. No. 3,538,007 to Cooper et. al. Other reported uses of methylene chloride include solvent degreasing, plastics processing, blowing agent in foams, solvent extraction, a solvent for cellulose acetate, and as an aerosol propellant.

The safe use of methylene chloride has been questioned by Federal agencies including the Food and Drug Administration (FDA). As a chlorinated solvent, methylene chloride has now been closely regulated for environmental protection. Recently, it was discovered that methylene chloride can cause tumors in rats and mice. The $LD_{50}$ orally in rats (young adults) has been found to be 1.6 ml/kg. Furthermore, the threshold limiting value (TLV) has been set at 100 ppm in air. See Kimura, et. al., Toxicol. Appl. Pharmacol. 19, 699 (1971). Since these discoveries, the wide use of the solvent by industry and consumers has come under close scrutiny by federal regulatory agencies. See, U.S. Pat. No. 4,749,510 to Nelson. Accordingly, it is now highly desirable to avoid the use of methylene chloride in paint stripping formulations.

The search for an alternative product to methylene chloride has focused attention on pyrrolidone type compounds, more specifically, N-methyl-2-pyrrolidone (NMP). NMP is less toxic than many competitive aprotic solvents and does not appear to be a sensitizing agent. NMP, a dipolar aprotic solvent, has a high dielectric constant and cannot donate protons for hydrogen bonding. Consequently, many of its applications involve its strong and frequently selective solvating power. NMP is commercially available (e.g., from BASF Wyandotte or GAF) and used industrially as a processing aid for polymeric resins, in petroleum processing (e.g., the extraction of aromatics from lube oil), for the production of electronic circuitry, and as a general industrial cleaning ingredient. NMP is a colorless liquid with a mild amine odor, is miscible with water as well as various organic solvents. See the Encyclopedia of Chemical Technology, Third Edition, Vol. 19, 514-520 (1981).

Although NMP was recognized as an early candidate for replacing chlorinated solvent type paint strippers, it was soon discovered that a formulation based entirely on NMP had a number of disadvantages.

For example, NMP has low viscosity and low adhesive properties which work against its efficiency to remove dried coats of paint on a vertical surface. In U.S. Pat. No. 4,764,222 to Colegrove, a NMP composition is reported where a viscosifying agent (rhamsan gum) is added to the NMP to improve the ability of the composition to cling to a painted surface when inclined in a vertical position. An effort to optimize or target the paint removing efficiency and water solubility of NMP, while at the same time controlling and minimizing any potential toxicity and volatility, has led to a variety of specific formulations combining NMP with other organic and inorganic compounds. In U.S. Pat. No. 4,276,186 to Bakos et. al., cleaning compositions containing at least 50% by weight of NMP and at least about 5% by weight of a water miscible alkanolamine and about 0-35% by weight of a hydrocarbon solvent were described as especially suitable for removing solder flux from a ceramic substrate. In U.S. Pat. No. 4,664,721 to Valasek, non-aqueous compositions of NMP, butyl cellosolve and cyclohexanone and a surfactant are disclosed which degraded or solubilized broad classes of printing ink residues on printing screens. In U.S. Pat. No. 4,812,255 to Suwala, an aliphatic organic acid, and alkylene glycol ether and NMP are combined and reported effective as an overall composition for paint removal. In U.S. Pat. No. 4,732,695 to Francisco, a paint stripper and coatings remover composition consisted of three essential components: NMP, a mixture of aromatic hydrocarbons and benzyl alcohol. In U.S. Pat. No. 4,749,510 to Nelson, there is described a paint stripping composition comprising about 20-90% by weight NMP, 30-70% by weight aromatic hydrocarbon solvent, and about 1-15% by weight of either formic, oxalic, acetic, citric, gluconic or glutamic acid. According to another aspect of Nelson, organic amines such as diethanol amine could replace the various organic acids. In U.S. Pat. No. 4,780,235 to Jackson, there is described a composition comprising at least 20% of at least one $C_1$ to $C_4$ dialkyl ester of at least one $C_4$ to $C_6$ aliphatic dibasic ester, in combination with 1-50% of such a nonhalogenated solvent such as NMP, and a second type of non-halogen containing solvent such as aromatic naptha.

Finally, for purposes of further illustrating the background art, reference is also made to the prior filed and commonly owned U.S patent application Ser. No. 398,052 which describes the use of 5-membered lactams in combination with compounds such as ethyl-3-ethoxypropionate. This particular composition provided enhanced solvating capability as compared to some of the earlier-mentioned lactam based strippers, along with partial water solubility for ease of removal, with non-toxic and biodegradable environmental characteristics.

Finally, an ARCO Chemical Company Technical Update recently suggested that NMP was the key active ingredient when combined at high dilution ratios (35-40%) with either soybean or coconut oil. However, it is to be emphasized that there was no appreciation, as disclosed herein, that natural oils themselves become active in the paint removing process since: (1) lowering the overall individual oil concentration develops a synergism between the oils and NMP that cannot be attributed to an increase in NMP levels alone; and (2) mixtures of oils act synergistically in combination with NMP at a much broader range of NMP concentrations than previously reported.

It can therefore be seen that the combination of NMP with a variety of organic compounds represents what has been a long-standing effort to maximize the stripping ability of this alternative paint and coatings remover. While some of the presently disclosed paint strippers have relied upon formulations and proportions of organic compounds in combination with NMP, none have recognized the novel and enhanced solvating power of the present invention which utilizes a natural oil component that is commercially widely available, less expensive than NMP, removes certain paints, coatings, inks or crayon at the same or better rate than NMP alone, can replace the majority of NMP in a given formulation, and are biodegradable, non-flammable and no-toxic.

It is accordingly an object of the present invention to provide an effective non-methylene chloride paint stripper composition that can be readily mixed and formulated to produce a stripper with the aforementioned solvating capability.

Another object is the provision of a stripper of the above type which can be applied by any conventional method, including wetting, wiping, spraying, brushing, dipping, troweling or otherwise.

Yet another object is to provide an effective composition with the aforementioned properties for cleaning urethane, polyester and epoxy compounds off of tools, molds, etc., particularly before the cure is complete.

A still further object is to provide a stripper composition of the above type which can be completely removed by water.

SUMMARY OF THE INVENTION

In one aspect of the invention, a non-toxic biodegradable and ambient temperature non-volatile liquid paint stripping composition is provided which comprises a mixture of the two following essential components: (1) a five-membered lactam, and (2) two or more natural oils. According to another aspect of the invention, a strong organic acid may be included as an accelerator in a natural oil/lactam combination to increase the stripping activity and attack particularly resistant types of paints. A suitable strong acid is formic acid.

In a preferred embodiment, the natural oil compounds are vegetable oils. The composition preferably also contains certain other components including a thickener, preferably a modified oil, such as hydrogenated castor oil. In general, any higher molecular weight and higher viscosity vegetable oil can be incorporated into a given vegetable oil/lactam combination to provide a composition more efficient for a vertical surface application.

The inventive composition is particularly effective for stripping and cleaning of paints and coatings, as well as cleaning some urethane, polyester and epoxy compounds off of tools, molds, etc., particularly before the cure is complete. The composition is effective in the stripping of latex-based coatings, acrylic lacquers, sprayed enamels, phenolic alkyd coatings, one and two-part low cure epoxy coatings and electrostatically applied melamine/epoxy films. The paint stripper composition of the invention is readily formulated from commercially available solvents and applied by any conventional method, including wetting, wiping, spraying, brushing, dipping, troweling or otherwise. The paint or coating is removed easily without any substantial waiting or soaking, followed by water rinsing to clean the removed paint. The paint/coatings stripper hereof can be removed completely by water. As formulated the stripper composition of the invention is essentially non-flammable, non-carcinogenic, non-toxic, and biodegradable, with a significant cost advantage over prior art formulation.

DETAILED DESCRIPTION OF THE PREFERRED EMBODIMENTS

Figure 1:
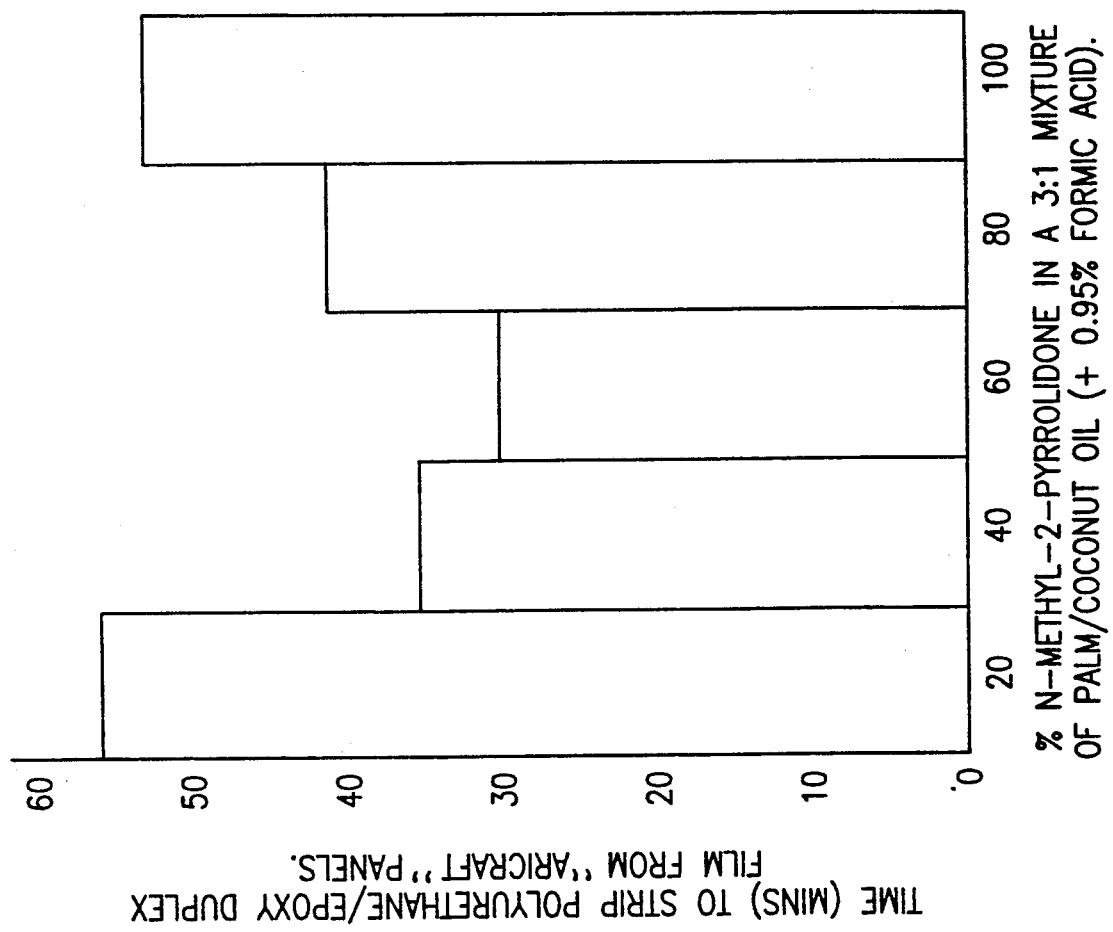
FIG. 1 illustrates the time in minutes to strip polyurethane/epoxy duplex film from aircraft panels as a function of %NMP in a 3:1 mixture of the palm/coconut and 0.95% formic acid.

One of the two essential components in the paint and coatings stripper formulation of the present invention is a five-membered ring lactam. Preferred in this group is N-methyl-2-pyrrolidone (NMP), as well as other hydrocarbon 2-pyrrolidones, for example, N-ethyl-2-pyrrolidone, N-isopropyl-2-pyrrolidone, N-cyclohexyl-2-pyrrolidone, 2-hydroxyethyl-2-pyrrolidone, N-dimethylaminopropyl-2-pyrrolidone, vinyl-pyrrolidone, 2-pyrrolidone and mixtures thereof. Particularly preferred is NMP which is a cyclic amide having a flashpoint (open-cup) of 95° C. The chemical formula for NMP is $C_5H_9NO$.

The second essential component of the present invention is two or more natural oil compounds, and in a preferred embodiment, the natural oils are vegetable oils. These include most of the fatty acid esters of glycerol, commonly called triglycerides or glyceryl esters. Accordingly, those vegetable oils that are suitable for combination with the various lactam compounds are those oils that first contain a mono-, di- or tryglyceride type base structure wherein a fatty acid ester substitution on the glycerol base compound provides the required polarity and/or activity towards paint removing action.

For example, the fatty acid esters can vary in molecular weight, which would effect the diffusion or viscosity of the glyceryl ester compound within a given substrate surface. Accordingly, the molecular weight of the fatty acid ester branch component, and the molecular weight of the complete glyceride compound itself, are to be collectively considered in the selection process.

Furthermore, the structure of the fatty acid ester can have a measurable effect on paint removing action. The fatty acid ester may be unsaturated in which case the presence of unsaturation may further effect the solvating ability of the particular vegetable oil/lactam combination.

Also in connection with this selection criterion of the glyceryl ester based vegetable oil, it will be appreciated that the vegetable oil may contain a variety of free components. Among such free components are free fatty acid compounds. Accordingly, the type of free fatty acid compound, as well as its concentration in the oil, may be considered in connection with the selection criterion of the instant invention.

Another free component found in the vegetable oils are certain free fatty acid alkyl esters. Accordingly, the type of free fatty acid ester compound, as well as its concentration in the oil, may be considered in the instant selection criterion.

Yet another free component in a vegetable oil includes a variety of unsaponifiable components, of which sterols and tocopherols are examples. Accordingly, the level of such components can be considered in a particular vegetable oil/lactam combination to provide paint removing action.

Finally, other miscellaneous components present in a vegetable oil that can effect its overall solvating ability, when used in conjunction with lactam compounds, include such components as carotenoids, chlorophyll and its derivatives, along with certain dissolved metals. For example, the carotenoid content of palm oil, one of the oils which has now been shown to be effective for paint removing action in conjunction with the lactam compounds now reported herein, can contain 500-1500 ppm carotene depending on its source. Those dissolved metals known to be present in oils include copper and iron. Heavy metals are also to be considered.

Furthermore, it can be more generally appreciated that the method of oil refining becomes important as to the final selection of the appropriate oil for a given oil/lactam combination. For example, it has been found that linseed oil (raw) is more effective than boiled linseed oil in a given linseed oil/lactapaint removing combination.

In particular, it has now been found that blends of the various oils can be made all in conjunction with blends of the various five-membered ring lactams. It has been found, for example, that the assorted blends of linseed, coconut, palm and soybean oil, in combination with a ring lactam, collectively act to provide novel paint removing action.

Apart from the structural variables of the base glyceryl ester, and the free component compounds distributed in various oils and noted above, the physical properties of the oils are also to be considered in a selection process. Accordingly, density, viscosity and melting behavior are those physical properties that are now considered when selecting an oil for use in conjunction with the lactam compounds reported herein for paint removing action. For example, it turns out that certain oils may have varying amounts of crystallized material, which is to be considered with respect to the ability of a particular oil/lactam combination to penetrate and solvate a given substrate that has been coated with paint or other types of organic coatings.

The preferred natural oils include the so-called edible vegetable oils, e.g. cottonseed, groundnut, soybean, sunflower, rape, sesame, olive, corn, safflower, palm, palm kernel, and coconut. Non-edible oils include linseed and castor oil. Other miscellaneous oils include peanut, fish, lard, mustard seed, poppyseed, turpentine, and tall oil.

The amount of each of the two essential components in the final composition may vary within a certain range. What is important, however, is that each be present in an amount sufficient to provide the composition with effectiveness for stripping and cleaning of paints, coatings, inks and crayon as well as cleaning urethane, polyester and epoxy compounds off of tools, molds, etc., particularly before the cure is complete. Therefore, in accordance with the broad principles of this invention, the combination of the two essential components from the above mentioned classes is achieved by a consideration of the solvating capacities of the respective components, individually and in combination, in order to obtain the most desired biodegradable, least flammable and highest threshold limiting values to meet or exceed health and safety standards, with a significant cost advantage over prior art formulations. Typically, the composition may contain from about 10-90% of the five-membered ring lactam, preferably from about 50-70%, and in the most preferred embodiment, about 55-65% by weight of the paint stripper composition. The other essential component, i.e. the natural oils, may be present in the composition from about 90-10%, preferably from about 30-50%, and in the most preferred embodiment, about 35-40% by weight of the paint stripper composition.

Furthermore, when the lactam is combined with a particular mixture of oils, the ratio of the oils to one another is to be adjusted to provide the most effective paint removing action. It has been found, for example, that the combination of 60NMP with a 3:1 mixture of palm/coconut oil results in a most efficient paint removing combination.

In the most preferred embodiment, blends of N-methyl-2-pyrrolidone with a mixture of linseed oil, coconut oil, palm oil, or soybean oil, at the ratio of 60% NMP/40% oil, wherein the ratio of oils to one another is adjusted to provide the most rapid paint removing action, results in an exceptionally safe and effective paint stripping system. In particular, a blend of 60NMP with 20% coconut oil, 10% palm oil and 10% linseed oil has been found to be effective for paint removal.

Furthermore, it has been found that the NMP/vegetable oil combinations described above can be made even more effective when a small amount of formic acid (0.5-5%) is added. Accordingly, rapid paint removal is achieved when 30% NMP is combined with about 0.5% formic acid along with about 30% coconut oil and about 40% palm oil.

It has also been found that formulations containing as little as 10-20% NMP are effective against some coatings. For example, a blend of 20% NMP/80% palm oil stripped an aircraft type polyurethane epoxy duplex coating in about 2.5 hours when trowled onto the surface.

Surface active agents also may be utilized in the composition. These compounds tend to reduce the surface tension when dissolved in water or water solutions, or reduce interfacial tension between two liquids, or between a liquid and a solid. Therefore, in the context of the paint stripping formulations of the present invention, which is partially water soluble, the surface active agents serve to make the various stripping formulations amenable to water flushing from the treated surface. That is, when the assorted formulations of this invention are applied to non-water soluble paints and coatings, along with surface-active agents, such agents are further believed to effect an emulsion of the organic residues that have been removed from the various substrates on contact with water. Such emulsions can then be rinsed from the treated surface with water.

In addition to improving the water removal of the inventive composition from a given surface, the surface active agents serve to couple or hold the system together as a homogenous medium of vegetable oil and lactam compound. It has also been found that the choice of surfactant then has a profound effect of the efficiency of a particular stripper formulation. This has led to speculation that the stripping mechanism of the vegetable oil/lactam combination is driven more by some unknown, but critical, surface effect.

The surface active agents that have been found suitable include the ethoxylated amines and amine oxides- which are part of the more general family of cationic surfactants. Imidazoline compounds are particularly preferred. It has also been found that such cationic surfactants can be employed in combination with non-ionic surfactants, particularly those with a low HLB value (hydrophile-lipophile balance, a measure of the emulsifying and solubilizing character of an nonionic or cationic surfactant).

Corrosion inhibitors may also be included in the inventive formulation. Such corrosion inhibitors are conventional. Typical corrosion inhibitors include mono-, di-, and triethanol amines as well as many solvent soluble commercial preparations. Other acceptable amines include diethylethanolamine, diisopropylamine, ethylamine, ethylenediamine, isopropylamine, monoisopropanolamine, morpholine, triethylenetetramine, and triisopropynolamine. Mixtures of said alkanolamines can be employed when desired.

For stripping vertical surfaces, the addition of a thickener or gelling agent is highly desirable. It will be appreciated, however, that in the context of the instant invention, many of the vegetable oils that are combined with the five-membered lactam are of relatively high molecular weight and viscosity such that they can be immediately applied to a vertical surface without the addition of a thickener or gelling agent.

Furthermore, depending on the particular vegetable oil/lactam combination selected, a vegetable oil of higher viscosity can be incorporated into the mixture to further provide an overall thickening effect. It has also been found that when it comes to thickening the vegetable oil/lactam combination, a modified oil, such as hydrogenated castor oil, becomes a preferred thickener. Other modified oils are available through the process of either interesterification (to rearrange the fatty acid groups in triglyceride mixtures) or fractional crystallization (modification of the melting properties without resorting to chemical change).

Finally, it is worth noting that traditional thickening agents, such as fine mineral powders like amorphous silica or Talc or Bentonite, or the carboxymethyl cellu-loses, generally fail to provide an effective thickening of the vegetable oil/lactam combination.

Dyes and fragrances can be selected according to the needs of product identification as well as aesthetics. The appropriate dye or fragrance should be chemically stable in the formulations, as well as having little or no effect on the ability of the given formulation to effect removal of the paint or coating from the substrate. Furthermore, the dye or fragrance should have little to no effect on the ability of the surface-active agent to create an emulsion so that rinsability with water is maintained. Preferably, only a small amount of such a dye or fragrance will be employed, from about 0.001% to 0.1% by weight of the entire formulation. Typical of such dyes are Pylaklor LX-1911A Orange which is available from Pylam. Any commercially available fragrance may be employed.

WORKING EXAMPLES

The following examples, illustrative of the present invention, involve: mixing of the constituents together by blending with a mechanical mixer in a tank or other similar vessel. The formulation of this invention is prepared by mixing the various vegetable oils at the preferred concentrations with the various lactam solvents. Depending upon an individual application, thickeners may be slowly added so as to allow the thickener to dissolve without forming a precipitate or large agglomeration. However, it is to be mentioned that in so far as the vegetable oils can be of sufficiently high molecular weight and viscosity, a thickener would not generally be required in order to prepare a formulation suitable for a vertical surface application.

Next, corrosion inhibitors, dyes and fragrances can be added, followed by the appropriate surface active agent or mixture of surface active agents.

The resulting formulation of the invention is used, preferably undiluted for removing paint or coatings from a substrate. The formulation may be applied to the paint or coated surface by spraying, brushing, dipping, troweling, or otherwise. The paint or coating on the surface is then softened by the reaction with lactam and the vegetable oil and is held in suspension on the surface by the thickener, if present. After the paint or coating is softened, the stripper and loosened paint may be removed by mechanical means (scraping or sanding the substrate) or with pressurized steam or water. The paint stripper normally requires 1 to 30 minutes to soften the paint on the substrate, depending on the type of paint.

Following the general procedures set forth above, the following formulations were prepared and are listed in Table I.

TABLE I

| | STRIPPER COMPOSITIONS | | | |
|---|---|---|---|---|
| | STRIPPER NO. | | | |
| | 1 | 2 | 3 | 4 |
| Composition % w/w | NMP 35% EEP 65% | DBE 53% NMP 12% Aromatics 150 30% Monoethanolamine 2% Potassium oleate 3% | NMP 60% Coconut oil 40% | NMP 60% Coconut oil 20% Linseed 10% Palm oil 10% |

Formulation 1 represents the combination reported in the now pending and commonly owned U.S. patent application Ser. No. 398,052. Formulation 2 represents the paint stripping combination of Jackson (U.S. Pat. No. 4,780,235), whereas Formulation 3 represents a single oil/NMP combination and Formulation and 4 represents the combinations of the instant invention.

The four paint stripping formulations listed in Table I were then applied to the following paint types to compare the stripping performance:

according to the general procedures described earlier, and are listed in Table IV.

TABLE IV

| | STRIPPER COMPOSITIONS | | | | | | | | | |
|---|---|---|---|---|---|---|---|---|---|---|
| | STRIPPER NO. | | | | | | | | | |
| | 5 | | 6 | | 7 | 8 | 9 | | 10 | |
| Composition % W/W | NMP Coconut oil Palm oil Linseed oil | 60% 20% 10% 10% | NMP Coconut oil Palm oil Formic acid | 30% 30% 40% 0.95% | CH₂Cl₂ 100% | NMP 100% | NMP Coconut oil | 40% 60% | NMP Coconut oil Palm oil Linseed oil | 10% 30% 30% 30% |

TABLE II

| PAINT CODES | | | | |
|---|---|---|---|---|
| PAINT KEY | PAINT TYPE | COLOR | APPLI-CATION | MANU-FACTURER |
| A | Latex gloss | Yellow | Brush | Sherwin Williams |
| B | Acrylic lacquer | Blue | Spray | Duplicolor Automotive |
| C | Enamel | Black | Spray | NY Bronze Powder Co. |
| D | Epoxy - 1 part | Ivory | spray | NY Bronze Powder Co. |
| E | Phenoli Alkyd | Brown | Brush | Sherwin Williams |
| F | Epoxy - 2 part | White | Brush | Sherwin Williams |
| G | Enamel | Red | Spray | Borden, Inc. |
| H | Epoxy - 1 part | Black | Brush | Sherwin Williams |
| I | Epoxy - Melamine | Ivory | Electro-static Spray | Ex Whirlpool |
| J | Alkyd gloss | White | Brush | Sherwin Williams |

Note that the sprayed coatings (B, C, D and G) were applied in two applications with a 15 minute drying period between the coats. Brushed coatings were applied as evenly as possible as one coat. The paints were applied to mild steel panels (10 cm × 30 cm). All panels were aged at 80° F. for 90 minutes, followed by overnight storage at room temperature, prior to the stripping evaluations.

A summary of the paint removing efficiency is summarized in Table III.

Formulations 5, 6 and 10 represent the combinations of the instant invention. Formulation 7 represents methylene chloride. Formulation 8 represents pure NMP. Formulation 9 represents the paint stripping combination reported in the ARCO Chemical Company Technical Update.

The five paint stripping formulations listed in Table IV were then applied to blue and red aircraft polyurethane topcoat/epoxy primer paint schemes on aluminum panels to compare the stripping performance.

TABLE V

| | COATING | |
|---|---|---|
| STRIPPER (TABLE IV) | Polyurethane Topcoat BLUE | Epoxy Primer RED |
| 5 | Stripped in 2¾ hours | Stripped in 2¼ hours |
| 6 | Stripped in 35 mins. | Stripped in 22 mins. |
| 7 | Slight edge attack after 20 hours | Slight edge attack after 20 hours |
| 8 | 80% lifted after 6 hours | 90% lifted after 6 hours |
| 9 | 90% lifted after 2½ hours | 90% lifted after 2½ hours |
| 10 | Stripped in 5 hours | Stripped in 5 hours |

With particular reference to Tables 4 and 5, it can be seen that by lowering the overall oil mixture concentration to levels of approximately 40%, a synergism develops between the NMP and the oils, which significantly improves the rate of paint removal. For example, Stripper No. 5 (60% NMP; 20% coconut oil; 10% palm oil; and 10% linseed oil) completely removed the red coating in 2¼ hours. By comparison, Stripper No. 8 (100% NMP) and Stripper No. 9 (40% NMP; 60% coconut oil) are only 90% effective after 6 hours and 2½ hours, respectively.

Note that by mixing the oils with NMP, particularly in the presence of a small amount of formic acid, an

TABLE III

| | PAINT STRIPPER TRIALS | | | |
|---|---|---|---|---|
| PAINT (Table II) | STRIPPER (Table I) | | | |
| | 1 | 2 | 3 | 4 |
| A | 15 min - 95+% stripped | 15 min - 95% stripped | 15 min - 95% stripped | 15 min - 100% stripped |
| B | 3 min - 100% stripped | 3 min - 100% stripped | 3 min - 100% stripped | 3 min - 100% stripped |
| C | 12 min - 100% stripped | 12 min - 100% stripped | 12 min - 100% stripped | 12 min - 100% stripped |
| D | 5 min - 100% stripped | 5 min - 100% stripped | 5 min - 100% stripped | 5 min - 100% stripped |
| E | 4 min - 100% stripped | 4 min - 100% stripped | 4 min - 85% stripped | 4 min - 100% stripped |
| F | 20 min - 40% stripped | 20 min - 10% stripped | 20 min - 85% stripped | 20 min - 100% stripped |
| G | 3 min - 100% stripped | 3 min - 100% stripped | 3 min - 100% stripped | 3 min - 100% stripped |
| H | 10 min - 95% stripped | 10 min - 95% stripped | 10 min - 100% stripped | 10 min - 100% stripped |
| I | 45 min - slight attack | 45 min - no apparent attack | 45 min - 95% stripped | 45 min - 100% stripped |
| J | 4 min - 100% stripped | 4 min - 100% stripped | 4 min - 100% stripped | 4 min - 100% stripped |

As used in Table III, "stripped" refers to that point where the film has been softened to such an extent that it was possible to remove the softened film by gentle scraping with a spatula.

As further illustration of the advantages of the instant invention, the following formulations were prepared enhanced rate or removal is achieved relative to a single oil/NMP combination (compare Stripper Nos. 6 and 9).

Moreover, Stripper No. 10 (10%, NMP, 30% palm oil, 30% coconut oil and 30% linseed oil) completely stripped the panels in 5 hours. By comparison, Stripper No. 8 (100% NMP) removes only 80-90% of the coating after 6 hours.

Additionally, as shown in FIG. 1, there is a definite synergism when NMP is combined with a 3:1 mixture of palm/coconut oil in the presence of 0.95% formic acid.

Finally, Tables VI and VII further illustrate the synergism between NMP and the various oil mixtures of the instant invention. As can be seen by comparison of Tables VI and VII, the combination of NMP with a mixture of soybean and coconut oil improves the rate of removal of a blue-color aircraft type polyurethane/epoxy duplex coating over a mixture of NMP with either individual oil.

TABLE VI

| % W/W NMP IN OIL | TYPE OF VEGETABLE OIL[1] | | |
|---|---|---|---|
| | CRUDE PALM OIL | CRUDE COCONUT OIL | DOMESTIC SOYBEAN OIL |
| 20 | 70 | No time available-mix was too thick for panel to be in contact | 70 |
| 40 | 35 | 40 | 50 |
| 60 | 40 | 40 | 55 |
| 80 | 55 | 60 | 65 |
| 100 | 65 | | |

[1]Table body entries are times (mins) to strip aircraft polyurethane/epoxy duplex coating.

TABLE VII

SYNERGISM OF NMP/SOYBEAN OIL/COCONUT OIL BLEND

| % NMP[1] | TIME TO LIFT[2] MINS. |
|---|---|
| 20 | 50 |
| 40 | 35 |
| 60 | 40 |
| 80 | 50 |
| 100 | 60 |

[1]NMP blended with a 50/50 mix of soybean and coconut.
Thus:
80% NMP is blended with
10% soybean and
10% coconut etc.
[2]Coating = Blue aircraft type polyurethane/epoxy duplex It is apparent that there has now been provided in accordance with the invention a paint stripper formulation and a method of making and using the same. It will be readily appreciated that the composition and method of the present invention overcome the disadvantages associated with the prior art paint strippers. In particular, the natural oils have been found to be more than a simple diluent system for NMP. When the oils are properly combined with NMP, at the indicated proportions, an effective synergistic system is observed.

The composition has a long work life which typically permits complete removal from the substrate with a single application regardless of the thickness of the paint accumulation. In most instances, the stripper can be left on until all the paint is loosened. Indeed, many coatings will totally dissolve if soaked. This is a significant advantage of the present invention as compared to methylene chloride paint strippers.

The paints upon which the paint stripper of the present invention is effective include those conventionally used as automotive touch-up paints, metal enamels, lacquers, varnishes, polymer paints and others used in industrial processes and also general purpose household paints and surface coatings. The stripping composition of the present invention also can be applied to reactive-vehicle or solvent borne coatings, and has also proven effective for cleaning urethane, polyester and epoxy compounds off of tools, molds, etc., particularly if applied before the cure is complete. While the invention has been described in conjunction with several specific embodiments, it is evident that many alternatives, modifications, and variations of the invention will be apparent in light of the foregoing description. Accordingly, it is intended to embrace all such alternatives, modifications, and variations as fall within the spirit and broad scope of the appended claims.

What is claimed is:

1. A non-toxic, biodegradable ambient temperature non-volatile paint stripping composition of formic acid with a mixture consisting essentially of a mix of 60% N-methyl-2-pyrrolidone and the remainder palm and coconut oils in a 3:1 ratio by weight, wherein the formic acid is 0.95% of the composition.

2. The composition of claim 1, wherein the mix contains 30% by weight palm oil and 10% by weight coconut oil.

3. The composition of claim 1, having 0.1 to 5% of a surfactant selected from the group consisting of methoxylated amines and amine oxides, 0.1-1% of a dye, 0.1-1% of a fragrance and 0.1-10% of hydrogenated castor oil, by weight of the composition.

* * * * *